(12) United States Patent
Babanats et al.

(10) Patent No.: US 12,043,509 B2
(45) Date of Patent: Jul. 23, 2024

(54) SYSTEM AND METHOD FOR DETERMINING STACKING AND SORTING QUALITY IN MACHINE APPARATUS THAT PROCESS MEDIA

(71) Applicant: Imaging Business Machines LLC, Birmingham, AL (US)

(72) Inventors: Robert L. Babanats, Vestavia Hills, AL (US); Peter Rudak, Hilton, NY (US); Anthony Pericolo, Westfield, NJ (US); Daniel Phinney, Rochester, NY (US); Jack Mottley, Rochester, NY (US); Hsin J. Yeh, Bayside, NY (US); Veerendra Balchand, Bronx, NY (US); Jimmy Jieming Zhang, Voorhees, NJ (US)

(73) Assignee: Imaging Business Machines LLC, Birmingham, AL (US)

( * ) Notice: Subject to any disclaimer, the term of this patent is extended or adjusted under 35 U.S.C. 154(b) by 248 days.

(21) Appl. No.: 17/457,525

(22) Filed: Dec. 3, 2021

(65) Prior Publication Data
US 2022/0177256 A1 Jun. 9, 2022

Related U.S. Application Data

(60) Provisional application No. 63/122,598, filed on Dec. 8, 2020.

(51) Int. Cl.
*B65H 43/06* (2006.01)
*G01M 99/00* (2011.01)
*G06F 17/14* (2006.01)

(52) U.S. Cl.
CPC .......... *B65H 43/06* (2013.01); *G01M 99/005* (2013.01); *G06F 17/142* (2013.01); *B65H 2553/30* (2013.01)

(58) Field of Classification Search
CPC ............................ B65H 2553/30; B65H 43/06
See application file for complete search history.

(56) References Cited

U.S. PATENT DOCUMENTS

| | | | | |
|---|---|---|---|---|
| 9,598,252 | B1 * | 3/2017 | Middleton | G01H 17/00 |
| 2002/0118351 | A1 * | 8/2002 | Takoh | B65H 39/11 |
| | | | | 355/72 |
| 2014/0360275 | A1 * | 12/2014 | Link | B65H 7/06 |
| | | | | 73/646 |

* cited by examiner

Primary Examiner — Howard J Sanders
(74) Attorney, Agent, or Firm — Harris Beach PLLC (57) ABSTRACT

A method for evaluating stacking or sorting integrity at an output device of a high-speed apparatus that processes media includes: acquiring an audio data substantially in real-time from the output device of the high-speed apparatus while the high-speed apparatus is in operation, by use of an audio sensor located at the output device; transforming by a processor, the audio data to into a stacking or sorting integrity value; and if the stacking or sorting integrity value exceeds a predetermined threshold, stopping by the processor a document transport of the high-speed apparatus. An apparatus for evaluating stacking or sorting integrity at an output device, and a system for evaluating stacking or sorting integrity at an output device of a high-speed apparatus are also described.

20 Claims, 7 Drawing Sheets

Flowchart for Stacking/Sorting Integrity

SYSTEM AND METHOD FOR DETERMINING STACKING AND SORTING QUALITY IN MACHINE APPARATUS THAT PROCESS MEDIA

CROSS-REFERENCE TO RELATED APPLICATIONS

This application claims priority to and the benefit of U.S. provisional patent application Ser. No. 63/122,598, SYSTEM AND METHOD FOR DETERMINING STACKING AND SORTING QUALITY IN MACHINE APPARATUS THAT PROCESS MEDIA, filed Dec. 8, 2020, which application is incorporated herein by reference in its entirety.

FIELD OF THE APPLICATION

The application relates to stacking and sorting integrity, particularly stacking and sorting integrity at the output of a document scanning and sorting apparatus.

BACKGROUND

Stacking and sorting integrity within apparatus that process media can be compromised for reasons including but not limited to tears, bends, crumples, displacement, misfeeds, and overflows. Stacking or sorting integrity is particularly important at the output of an apparatus that processes media, such as, at an output tray or bin.

SUMMARY

A method for evaluating stacking or sorting integrity at an output device of a high-speed apparatus that processes media includes: acquiring audio data substantially in real-time from the output device of the high-speed apparatus while the high-speed apparatus is in operation, by use of an audio sensor located at the output device; transforming by a processor, the audio data into a stacking or sorting integrity value; and if the stacking or sorting integrity value exceeds a predetermined threshold, slowing or stopping by the processor a document transport of the high-speed apparatus.

The method, further including the step wherein if the stacking or sorting integrity value exceeds a same or different predetermined threshold, reporting by the processor a visual display or a sound cue, based on the stacking or sorting integrity value.

The step of transforming by the processor, can include transforming by the processor, the audio data in a time domain. The step of transforming by the processor, can include converting the audio data from a time domain into frequency domain data, and wherein the integrity of output operation value is determined at least in part based on the frequency domain data. The step of converting by the processor can include converting by the processor running a fast Fourier transform (FFT) process, the audio data from the time domain to the frequency domain data. The step of transforming by the processor, can include transforming by the processor the audio data in a time domain, a frequency domain, or combination thereof by a neural network running on the processor.

The step of acquiring the audio data from the output device of the high-speed apparatus can include acquiring the audio data by a microphone or a contact microphone. The step of acquiring the audio data from the output device of the high-speed apparatus can include acquiring the audio data by a plurality of audio sensors.

The method can further include, following the step of transforming, the step of redirecting media to another destination if the integrity of output operation value falls below a low threshold value.

The step of converting by the processor can include converting by the processor, the audio data from a time domain to a frequency domain to generate energy content data in two or more bandwidths.

The step of acquiring the audio data from the output device of the high-speed apparatus includes acquiring the audio data of a media in motion or in freefall before being deposited on the output device.

The step of transforming further can include determining if the output device of the high-speed apparatus is full.

An apparatus for evaluating stacking or sorting integrity at an output device of a high-speed apparatus that processes media includes at least one apparatus section where media is stacked or sorted. At least one detection device listens substantially in real-time to audio generated by the output device in operation and which acquires an audio data. An audio energy content process runs on a processor that analyzes an audio energy content within one or more bandwidths of the audio data. An output device quality of operation process generates a stacking or sorting integrity value based on the audio energy content within the one or more bandwidths of interest. If the stacking or sorting integrity value exceeds a predetermined threshold, the processor slows or stops a document transport of the high-speed apparatus.

A visual device or an aural device can provide an indication of an operational failure at the output device based on a same or different predetermined threshold in comparison to the stacking or sorting integrity value.

The apparatus can include a neural network.

At least one detection device can include a microphone or a contact microphone.

An output full device indication can be based on the stacking or sorting integrity value. Based on the output full device indication, the apparatus can direct media to a different stacking or sorting location.

A system for evaluating stacking or sorting integrity at an output device of a high-speed apparatus that processes media substantially in real-time includes an audio sensor disposed in or near the output device to acquire audio data from the output device of the high-speed apparatus while the high-speed apparatus is in operation substantially in a real-time. A processor to run a process to transform the audio data into a stacking or sorting integrity value. If the stacking or sorting integrity value exceeds a predetermined threshold, the processor slows or stops a document transport of the high-speed apparatus.

A visual display or a sound cue can be operatively coupled to the processor to provide an indication of a fault condition based on exceeding a same or different predetermined threshold of the stacking or sorting integrity value.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Definitions

Document as used hereinbelow include sheets, envelopes, papers, etc.

Stacking or sorting integrity—Stacking or sorting integrity is an indication of the successful accomplishment of a desired document stacking or a document sorting operation, typically at the output (e.g. at one more or more trays or bins) of a document sorting apparatus. Successful accomplishment of desired document stacking or sorting can be defined by the manufacturers of the device. Successful accomplishment of desired document stacking or sorting can be defined by the user of the device. Stacking or sorting integrity can be indicated by a stacking or sorting integrity value or when specific to an output device, for example, an output device operational integrity value. The stacking or sorting integrity value can be a numeric value such as, for example, an integer between 1 and 10, or a letter grade, such as, for example, an alphabetic character A to F. Any suitable alphanumeric values, including numbers (e.g. integer or real), letters, and combinations thereof can be used.

Visual display—As described hereinabove, stacking and sorting integrity within apparatus that process media can be compromised for reasons such as tears, bends, crumples, displacements, misfeeds, and overflows. Stacking or sorting integrity is particularly important at the output of an apparatus that processes media, such as, at an output tray or bin.

Stacking and sorting integrity can be compromised within scanners because scanners process used or aged documents which are susceptible of being damaged or distorted by document transport. The need to assess the stacking or sorting integrity in real-time when operating an apparatus that processes media becomes greater when working with high-speed or large devices that process media. In high-speed devices that process media, several pieces of media can be sorted or stacked in the output of the apparatus that processes media within a single second and can result in severe media damage within a short amount of time when stacking or sorting integrity is low. Large apparatus that process media can have operators who cannot visually assess the integrity of media stacking and sorting while operating the apparatus because media is sorted on opposite sides of a room or in another room altogether.

Stacking and sorting integrity at the output of apparatuses that process media can have varying impacts. Sometimes, the operator of an apparatus that processes media wants the media to be sorted in a certain order. In the most benign case of compromised stacking or sorting integrity, media can be transported to an output of an apparatus that processes media in a different order other than the desired order. Other times, sensitive and aged documents could collide with each other due to low stacking or sorting integrity and subsequently be damaged or destroyed. A system and method to return real-time data regarding stacking integrity while the apparatus is in operation is needed.

When determining how to assess sorting or stacking integrity, it is helpful to first look at methods that aid in safe media transport. Two commonly used methods are used to detect media disfiguration or disorientation during the operation of apparatus that process media are optical sensors and ultrasonic detection. Optical sensors track document transport along an apparatus that processes media. For instance, feedback from optical sensors indicates whether a document arrives at a pre-specified part of an apparatus that processes media later than intended or whether it does not arrive at all. In the event that a document does not arrive at a pre-specified part of an apparatus that processes media or arrives at the part too late, then an error signal is released, the user is notified of an error through a visual or audio cue, and the apparatus that processes media is stopped.

Similarly, ultrasonic sensors are used in devices that process documents to detect any overlap in documents. If documents overlap each other, then the transmitted sound from the ultrasonic sensor is reduced, an error is generated, the user is notified of the error through a visual cue, and the apparatus is stopped. Both ultrasonic and optical sensors nearly immediately stop apparatus that process.

Although use of optical sensors and ultrasonic sensors determine proper document transport, the sensors are infeasible on the output of devices that processes media where media is stacked or sorted. Outputs of apparatus that process media are often tight spaces, so optical sensors and ultrasonic detectors cannot provide meaningful data or cannot provide feedback on compromised stacking or sorting integrity with high accuracy. Furthermore, optical sensors and ultrasonic sensors work most accurately when media is transported on a fixed track.

After being transported through a fixed track, media can be dropped, flipped, thrown, or ejected from apparatus that process media right before entering its final destination at the output of devices that process media. Additionally, optical sensors and ultrasonic detectors can detect media damage at high accuracy when a single document is on a fixed transport path but are less accurate when multiple pieces of media are in the air—that is, the media falls under the influence of gravity into its destination after being dropped, flipped, thrown, or ejected on the output of an apparatus that processes media. Even if an apparatus uses ultrasonic sensors or optical sensors to verify proper media transport during fixed-path media transport or implemented on the output of an apparatus that processes media, evaluation of stacking or sorting integrity of media in real-time is therefore difficult. Prior to implementation of the new method described by the Application, there was no way to assess stacking or sorting integrity other than through visual inspection, which may not always be possible.

Whenever media experiences tears, bends, crumples, jams, or other types of disfiguration or disorientation while being moved by an apparatus that processes media, a sound is produced that can be distinguished by the human ear by those with extensive experience, from proper media stacking or sorting within the device. Unfortunately, on human response time scales, even where an experienced person perceives of a problem, by the time they took some action, a high speed apparatus that process media would already have produced a document wreck with consequences ranging from damaged documents to a pile of crashed documents jammed in an output device. Also, an expert listening to one part of one high speed apparatus that process media during R&D is very different from running two or more machines in the same location.

Where multiple machines are in simultaneous use, the operator position is typically far from most parts of most of the machines. Even if an operator is near a machine, they are likely positioned at the front end feed portion of the machine, rather than near the output device. Typically, a person would only be near the output device to unload a full pocket where the output device had operated correctly, or worst case, to unload or to untangle a jam of documents or missorted documents following a machine failure, often not detected or acted on until the high speed track backs up. Therefore, an operator cannot perceive subtle sounds that might indicate an impending problem, let alone on which machine or which specific pocket such a problem might be in, in a sorting room.

While timely and locatable impending problems cannot be detected by human hearing, sound data can be collected by any suitable transducer, and then quickly analyzed by one or more processors, and therefore can be useful for assessing stacking or sorting integrity, especially in high-speed devices that process media. Sound has been used to monitor transport of documents through high-speed devices that process media, however not at the transport system at the output bins or trays.

It was realized that with at least one sound transducer (e.g. a microphone) at an output device of a high-speed devices (e.g. 125 inches/second) that process media, the received audio information (sound) can be processed by a computer (having one or more processors) to timely alert to an impending problem (typically a document wreck, such as a jam, or sorting failure) where the indicia of output device sorting failure can also timely stop a particular track to the specific malfunctioning output device before the document wreck at the output device involves tens to hundreds of documents.

The new system cannot be performed by a human expert engineer or operator (time scales in tens or hundreds of milliseconds, multiple pockets, multiple machines operating together, etc.), however there are at least three computer based processes to monitor sound at an output device of a high-speed apparatus that processes media, which are now described. In the prior art, the common wisdom was to monitor and detect jams in the transport on the document track which ultimately feeds an output device of the high-speed apparatus that processes media.

It was realized that much of the track sound monitoring of the prior art was determining some high-speed apparatus failures too late. A sort failure at an output device was typically well advanced, before the output device failure caused a corresponding backup along the high speed track leading to the output device. The new processes according to the Application, includes both at least one sound transducer (e.g. a microphone) at each output device (e.g. a spinning spindle and pocket device), and a computed indication of an assessment of a media stacking or sorting integrity based on sound acquired at, in, or near a specific output device of a specific high-speed apparatus that processes media (a high-speed sorting machine apparatus). Based on the assessment of a media stacking or sorting integrity each of the described processes can slow or stop the documents moving through the high speed track, before a failure at an output device compounds to cause a backup jam with additional likely damage to both the documents as well possibly causing damage to the machine itself.

For most of the methods, at least to begin the process, for an initial assessment of a media stacking or sorting integrity, one or more experts can listen to the sounds, or evaluate processed output device sound information, and manually rank the results on some scale, from a range of normal operation to concern of output device minor failure to an output device document wreck, such as, for example, on a scale of 1 to 10. Predetermined thresholds can be defined where certain mitigating actions automatically occur at machine document feed speed. For example, a "3" might alert an operator to a possible problem for further investigation. A "5" might alert a slow-down of the document track speed until resolved, and above an "8" could stop the track feed to the output device.

Once the processes are running, where capable, the processes could further include any suitable aspect of machine learning, where for example, thresholds are automatically adjusted during machine operation for greater efficiency. Other parameters, such as, for example, audio filter parameters, can also be automatically adjusted for a specific output device. For example, where there are multiple high-speed sorting machine apparatus operating in a common space, one specific output device might automatically register that certain indicia of output failure indications for its own output device are actually caused by ambient sound reception (such as from a nearby machine) and measuring normal operation of its own output device and track, might suppress a particular sound, or change a threshold to account for such audio interference.

In the various approaches and solutions according to the Application, audio data in time domain, frequency domain, or any combination thereof, can be transformed by a processor into a stacking or sorting integrity value. Various actions, such as, for example, warnings, alerts, track and/or output device slowing, re-routing of track some or all of the output documents to one or more different output devices, and slowing or stopping of the track and/or output device can be based on the stacking or sorting integrity value. Multiple approaches can be used to analyze the time domain and/or frequency domain data to determine the integrity level of stacking, including pre-determined algorithmic methods or artificial intelligence methods, such as neural networks, that are based on training.

Figure 2:
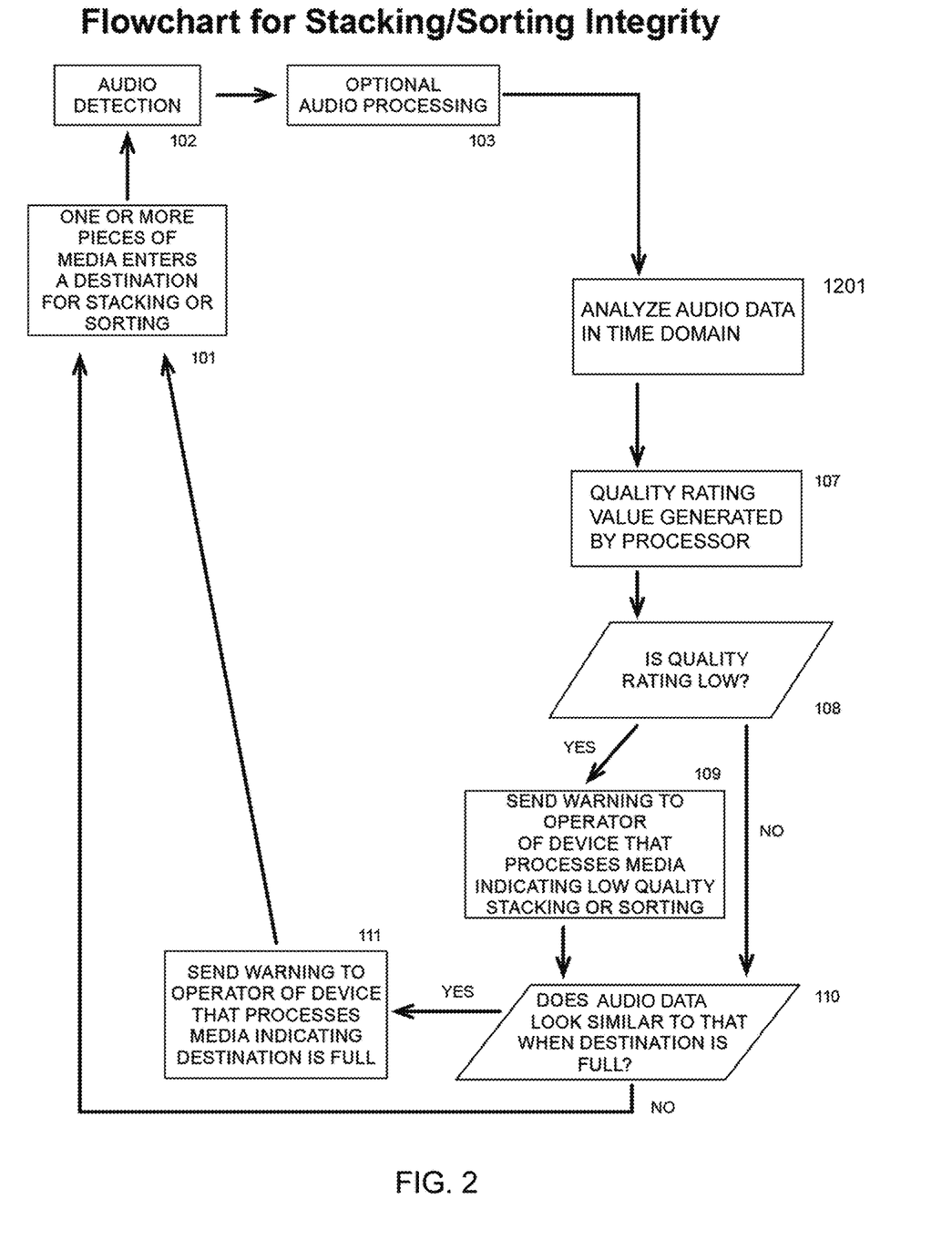
FIG. 2 is a drawing showing a software flow chart of an exemplary method for determining stacking and sorting quality according to the first approach, in apparatus that process media according to the Application.

In a first approach (time domain analysis, FIG. 2) according to the Application, a sound transducer mounted in, on, or near an output device of a high-speed sorting machine apparatus is operatively coupled to at least one processor. A process running on the processor evaluates the received sound information in the time domain, typically be audio sound level threshold. There can also be one or more audio filters (analog or digital) such as, for example, band limiting filters which process the audio time domain data before comparing to pre-determined thresholds. There can also be arithmetic operations in the time domain, such as, for example, where a predetermined reference sound data in the time domain is subtracted from incoming sound data substantially in real time. As described hereinabove, thresholds, here audio sound level (amplitude) thresholds can be predetermined, such as by lab or manufactured assembly line measurements of various output device failure conditions. FIG. 2 is a drawing showing a software flow chart of an exemplary method for determining stacking and sorting quality according to the first approach, in apparatus that process media according to the Application.

Figure 3:
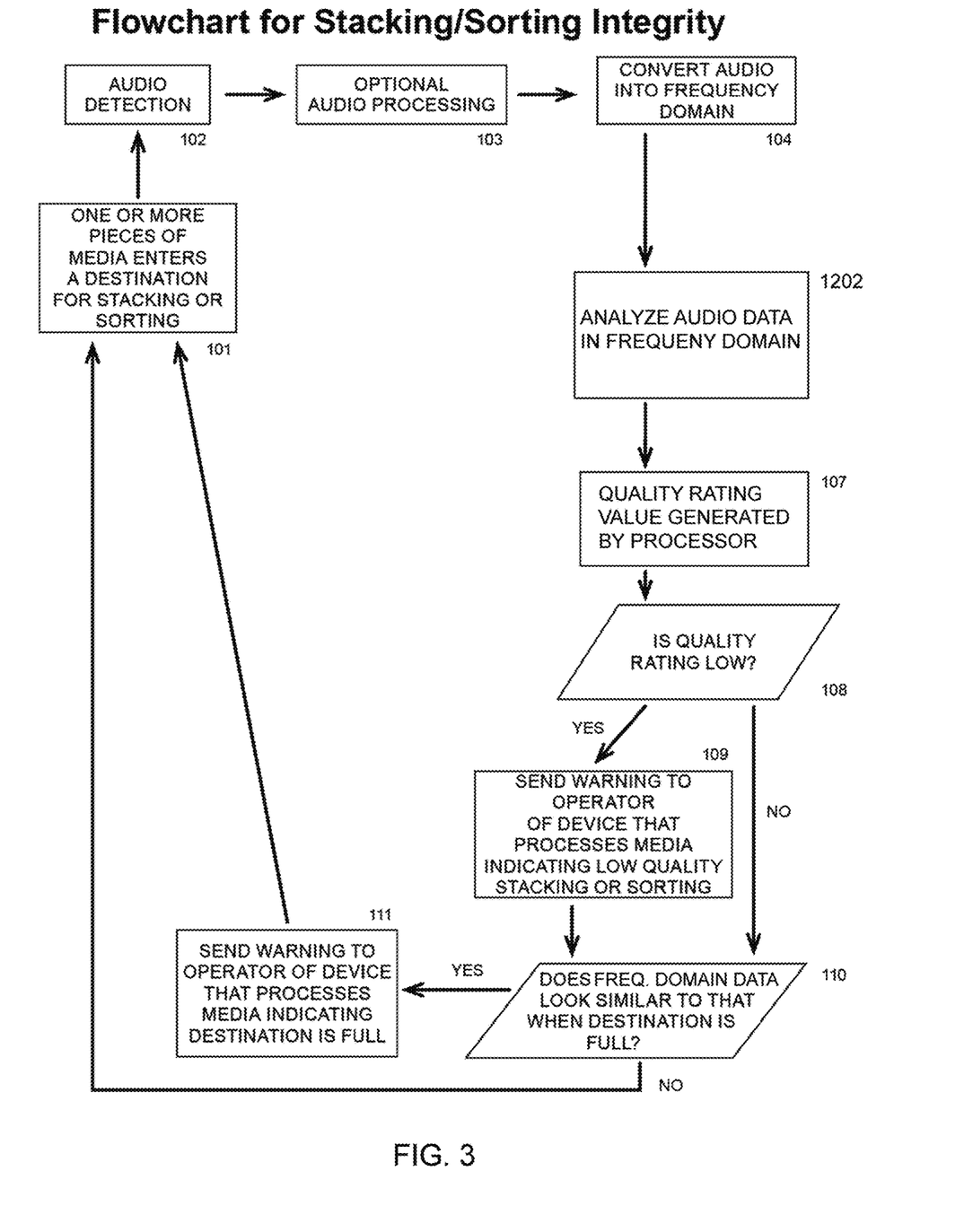
FIG. 3 is a drawing showing a software flow chart of an exemplary method for determining stacking and sorting quality according to the second approach, in apparatus that process media according to the Application.

FIG. 3 is a drawing showing a software flow chart of an exemplary method for determining stacking and sorting quality according to the second approach, in apparatus that process media according to the Application. In this second approach (frequency domain analysis, FIG. 3), the sound information in time domain can be first converted to the frequency domain by any suitable process, typically by a FFT process. Thresholds are then established for levels of one or more amplitude levels of a frequency bin. There can also be combinations of levels of frequency bins computed before a threshold comparison is made. This second approach can also include any suitable audio filtering performed in time domain (analog or digital) prior to conversion to the frequency domain. Thresholds as before, at least initially, are determined by testing and consideration of one or more high-speed sorting machine apparatus, at least initially, one at a time, typically in a manual testing operation by one or more experts simulating various output device failure conditions and observing process results.

Figure 4:
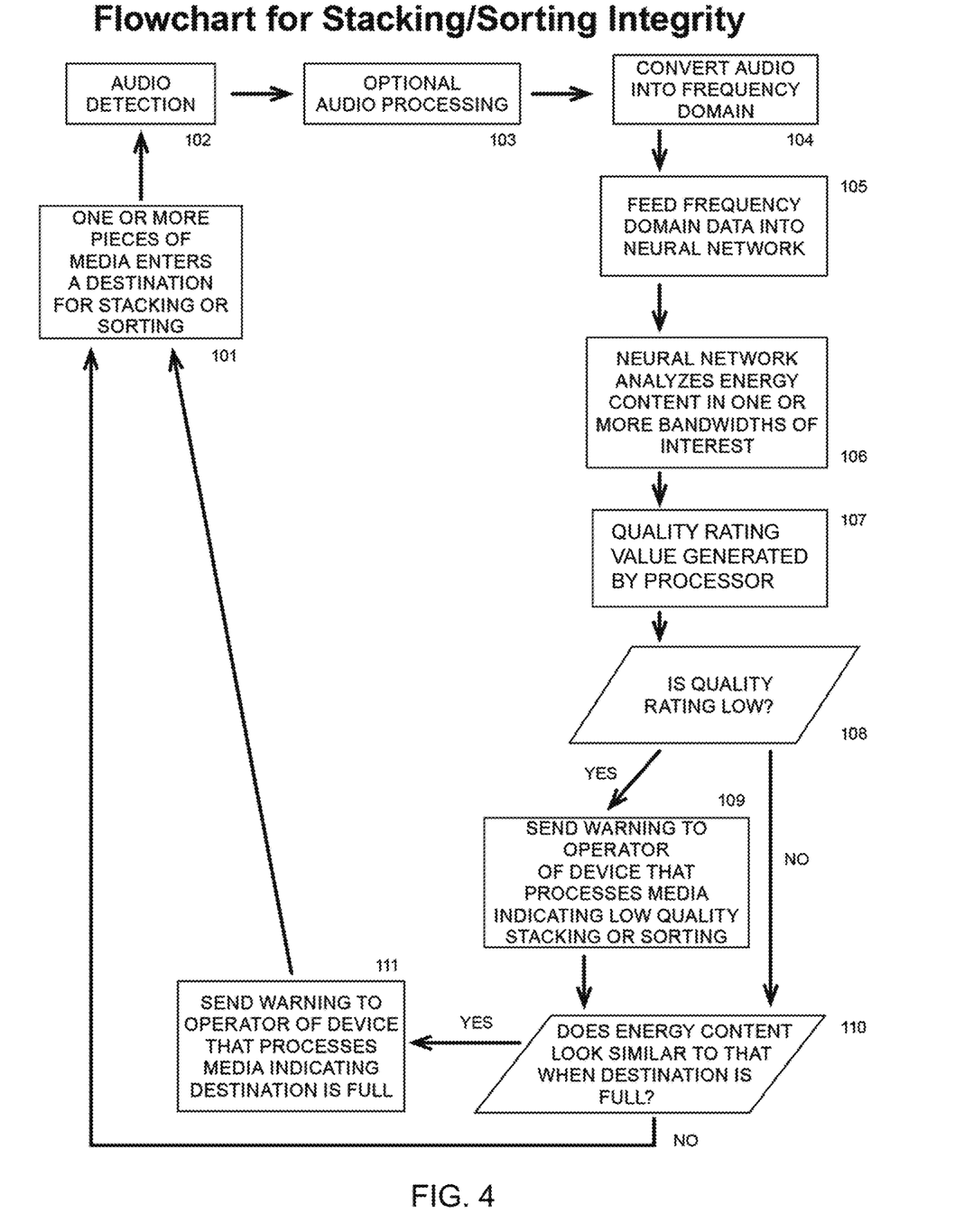
FIG. 4 is a drawing showing a software flow chart of an exemplary method for determining stacking and sorting quality according to the third approach, in apparatus that process media according to the Application.

FIG. 4 is a drawing showing a software flow chart of an exemplary method for determining stacking and sorting quality according to the third approach, in apparatus that process media according to the Application. In this third approach (analysis by neural network, FIG. 4), the processes which evaluate either time domain audio data, frequency domain data, or combinations thereof, are operatively coupled to a neural network. At least initially, various failure conditions are simulated to provide a ground truth data to teach the neural network how to detect various high-speed sorting machine apparatus output device failure conditions.

The three solutions, time domain analysis, frequency domain analysis, and analysis by neural network are now described in more detail hereinbelow.

Time Domain Analysis (FIG. 2)

Turning back to the time domain based analysis of FIG. 2, when one or more pieces of media enters a location for stacking or sorting within an apparatus that processes media, a sound 101 is produced. Real-time audio is collected during the operation of an apparatus that processes media through one or more detection devices including, but not limited to, an audio transducer, a piezoelectric detector, or a microphone 102.

The audio signal can optionally be processed by prefiltering to analyze energy content in one or more bandwidths of interest or amplification to ensure that the audio signal operates at a level which can be reliably processed 103. The audio data can then be analyzed by the processor in the time domain.

Analysis 1201 can be conducted in a way suitable to the application. For example, where the application of the method includes stacking or sorting integrity of one type of media, then time domain data, typically with an emphasis on amplitude thresholds, and amplitude thresholds within one or more audio bandwidths can be used to detect anomalies within one bandwidth of interest. This analysis can place an emphasis on the total energy content within specific bandwidths of interest in real time and compare it to the total energy content of that same bandwidth of interest during times at which stacking or sorting integrity was low.

The time domain data from audio detection 102 and optional audio signal processing 103 is converted by analysis 1201 into a quality rating 107, such as a stacking or sorting integrity value. At quality rating low determination 108, there can be a first threshold determination based on the quality rating 107. If the threshold is exceeded, there can be a warning 109 sent to the operation via a computer display, such as the apparatus computer display, a visual warning, such as a light, an audio warning, or any combinations thereof.

There can also be a check based on the time domain data to determine if the output device is full 110. If the processor 1103 (FIG. 1) determines that the output device is full 110, there can be any suitable type of warning 111 sent to the operator of the apparatus.

Thresholds can be determined initially by one or more experts listening to or monitoring audio data and assigning quality ratings to various audio data under different output device actual or simulated conditions. Such assigning of threshold values can be done for a given type, model, and operating and media parameters of a high-speed apparatus, or for each individual machine at time of manufacture or during an installation process in the field.

Operating and media parameters can include, for example, track speed, media size, media type and weight, gap setting between media, and media feed orientation. Documents running at 50 inches per second will have a different audio output and threshold values than documents being run at 125 inches per second. The speed parameter can be passed from the transport control processor to the processor 1103. Similarly, media size, media type and weight, gap setting between media, and media feed orientation (portrait or landscape) are some examples of additional parameters that can be passed to the processor 1103 that can increase the accuracy of threshold values associated with a batch of work. Typically, an application software that runs the system allows the user to setup parameters for each batch of media run.

Frequency Domain Analysis (FIG. 3)

Figure 1:
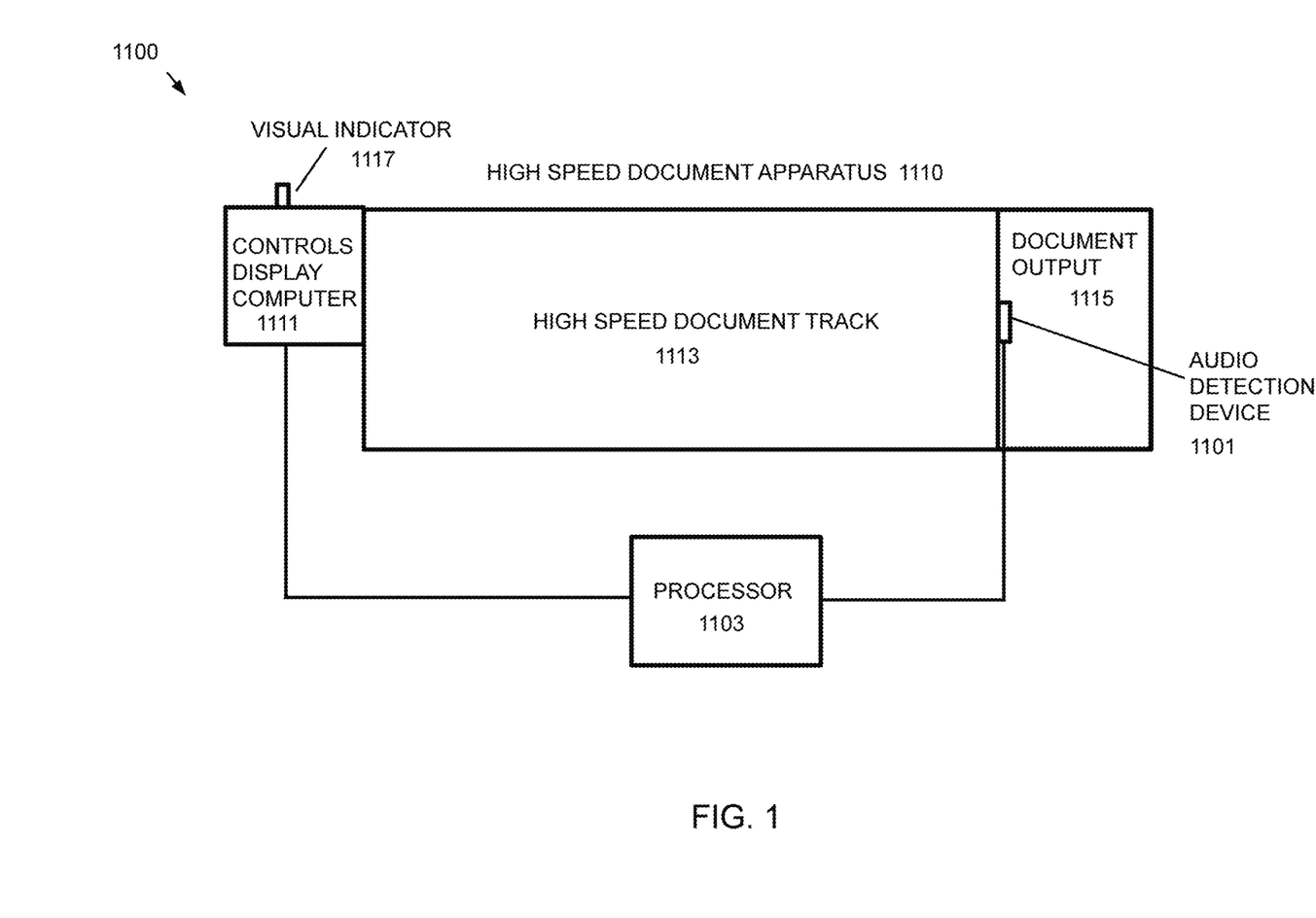
FIG. 1 is a hardware block diagram of an exemplary system for determining stacking and sorting quality in apparatus that process media according to the Application.

Turning now to the frequency domain based analysis of FIG. 3, one difference is that now the time domain data is converted to the frequency domain before analysis by processor 1103 (FIG. 1). The frequency domain data is then transformed into the quality rating value, such as a stacking or sorting integrity value.

When one or more pieces of media enters a location for stacking or sorting within an apparatus that processes media, a sound 101 is produced. Real-time audio is collected during the operation of an apparatus that processes media through one or more detection devices including, but not limited to, an audio transducer, a piezoelectric detector, or a microphone 102.

The audio signal can optionally be processed by prefiltering to analyze energy content in one or more bandwidths of interest or amplification to ensure that the audio signal operates at a level which can be reliably processed 103. The audio data can then be transformed by any suitable process (e.g. FFT) from the time domain to the frequency domain 104.

Analysis 1202 can be conducted in a way suitable to the application. For example, where the application of the method includes stacking or sorting integrity of one type of media, then frequency domain data, typically with an emphasis on thresholds of frequency bins in the frequency domain, and thresholds of frequency bins within one or more audio bandwidths can be used to detect anomalies within one bandwidth of interest. This analysis can place an emphasis on the total energy content within specific bandwidths of interest in real time and compare it to the total energy content of that same bandwidth of interest during times at which stacking or sorting integrity was low.

The frequency domain data 104 is converted by analysis 1202 into a quality rating 107, such as a stacking or sorting integrity value. At quality rating low determination 108, there can be a first threshold determination based on the quality rating 107. If the threshold is exceeded, there can be a warning 109 sent to the operation via a computer display, such as the apparatus computer display, a visual warning, such as a light, an audio warning, or any combinations thereof.

There can also be a check based on the frequency domain data to determine if the output device is full 110. If the processor 1103 (FIG. 1) determines that the output device is full 110, there can be any suitable type of warning 111 sent to the operator of the apparatus.

Thresholds can be determined initially by one or more experts listening to or monitoring audio data in the frequency domain and assigning quality ratings to various audio data under different output device actual or simulated conditions. Such assigning of threshold values can be done for a given type, model, and operating and media parameters of a high-speed apparatus, or for each individual machine at time of manufacture or during an installation process in the field.

Analysis by Neural Network (FIG. 4)

Turning now to the analysis by neural network of FIG. 4, when one or more pieces of media enters a location for stacking or sorting within an apparatus that processes media, a sound 101 is produced. Real-time audio is collected during the operation of an apparatus that processes media through one or more detection devices including, but not limited to, an audio transducer, a piezoelectric detector, or a microphone 102. In passive listening, no additional software or hardware is needed to produce artificial sounds for the detection device to collect. Use of a contact microphone can increase the speed of sound detection, as sound travels faster through a solid than through air.

The audio signal can optionally be processed by prefiltering to analyze energy content in one or more bandwidths of interest or amplification to ensure that the audio signal operates at a level which can be reliably processed 103. The audio data is converted into its frequency domain using an FFT or any other suitable technique in hardware and/or software to provide frequency domain information from audio acquired in the time domain, and energy content within one or more bandwidths of interest are analyzed 104. In the exemplary method of FIG. 2, the transformed data in the frequency domain is then fed to the input of a neural network 105 for analysis 106 by the neural network.

Analysis can be conducted in a way suitable to the application. For example, if the application of the method includes stacking or sorting integrity of one type of media, then the neural network can be trained to detect anomalies within one bandwidth of interest. This particular analysis by the neural network would places emphasis on the total energy content within specific bandwidths of interest in real time and compare it to the total energy content of that same bandwidth of interest during times at which stacking or sorting integrity was low. If users will be stacking or sorting different types of media, then the user can train the neural network to consider total energy content within all bandwidths of interest with more equal importance than the aforementioned analysis because stacking or sorting integrity could dip according to a number of different sounds.

To improve accuracy of the neural network analysis algorithm and reduce the number of false positives, the main processor of an apparatus that processes media can feed apparatus-state data to the neural network in addition to the transformed audio data. For example, if the apparatus is in the transition of sending media to a different output tray, then the main processor could indicate to the neural network that the apparatus is in the transition of sending media to a different output. The act of transitioning outputs will generate a frequency spectrum that is different than normal device operation, and if that transition generates more energy content within one or more bandwidths of interest which is similar to the energy content within one or more bandwidths of interest during times at which stacking or sorting integrity deteriorates, then the neural network should consider the apparatus state in its energy content analysis.

The bandwidths of interest and pre-specified threshold can be found through collection of audio data and subsequent analysis using machine learning or other signal processing techniques. During proof of principle testing, audio samples were collected when stacking or sorting integrity was low within devices that process media. Then, these samples were compared to audio samples of the device's operation when media was stacked or sorted at high quality. During various exemplary analyses, attention was paid to energy content within bandwidths of around 300 Hz.

The output of the neural network is a measure of the stacking or sorting integrity 107. The output of the neural network can be a discrete measure of the stacking or sorting integrity, though not just binary, or there can be a continuous measure of the stacking or sorting integrity, such as the output of a formula whose inputs are the energy content within the bandwidths of interest. The output is produced in real-time. Stacking or sorting integrity can be communicated to the user in multiple ways, such as, for example, by software, audio cues, or visual cues. For example, the visual or audio device can flash a warning only when the stacking quality is low or dipping. No cue could indicate no drop in quality. A visual warning can also be displayed (e.g. on screen) when the quality deteriorates.

When stacking or sorting integrity dips in quality 108, the user is notified through a warning and an option to stop the apparatus is given to the user 109. Media can be redirected into another destination when stacking or sorting quality drops. When stacking or sorting integrity is extremely low, an apparatus that processes media automatically can automatically stop itself.

The manufacturer of an apparatus that processes media can implement the neural network in different ways according to consumer preferences. An apparatus that processes media can come with a pre-trained neural network, or an apparatus that processes media can contain a neural network that can be trained by a user. Within apparatus that process media that contain neural networks that can be trained by a user, a software program built into the apparatus that processes media can ask a user for feedback on the quality of stacking or sorting and based on user feedback, and will then be able to develop a model to assess the quality of stacking and sorting integrity. The neural network can be trained by a manufacturer of an apparatus that processes media or by a user of an apparatus that processes media to evaluate stacking or sorting integrity using a variety of different media, as each type of media emits a distinct frequency pattern when stacking or sorting integrity is compromised.

The audio data can also be used to assess whether one or more output locations of an apparatus that processes media is full. When one or more detection devices are obstructed by media on the output, the energy content of the audio recorded by a detection apparatus drops. The neural network can determine whether the output of an apparatus that processes media is full based upon a sudden and consistent drop in the energy content of transformed data in the frequency domain or other means 110.

An alternative method to detect whether the output of an apparatus that compromises media is full is to determine the directionality of the sound entering a detection device. When it is determined that the origin of the sound captured by one or more detection devices is emitted from a predetermined level where the apparatus that processes media is full, then the neural network will notify the user that the output is full. The neural network can communicate the extent to which the output of the apparatus that processes media is full in the same quality measure as that communicated through stacking or sorting integrity or a separate quality measure 111. Media can be directed to a different output location when the neural network determines that a media stacking or sorting location is full, or the apparatus can stop operation altogether when one or more stacking or sorting locations is full.

Any of the suitable techniques described with respect to the neural network solution of FIG. 4, can also be used with other solutions in time domain or frequency domain without use of a neural network.

Figure 5:
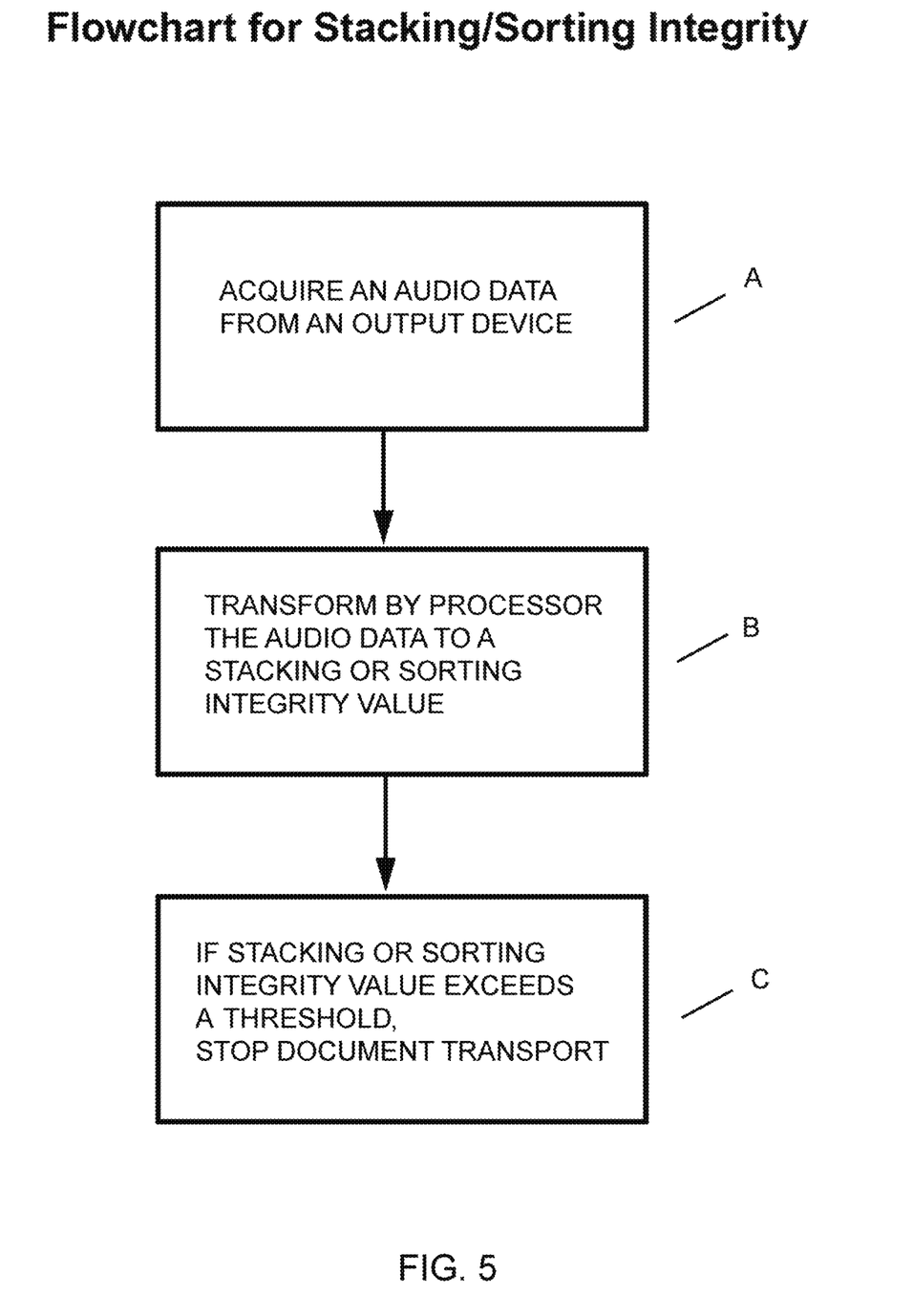
FIG. 5 is a flowchart showing a general method according to the Application.

In summary, FIG. 5 is a flowchart showing a general method according the Application. A method for evaluating stacking or sorting integrity at an output device of a high-speed apparatus that processes media includes: A) Acquire an audio data from an output device; B) Transform by processor, the audio data into a stacking or sorting integrity value; and C) If the stacking or sorting value exceeds a threshold, slow or stop the document transport. Typically, there can also be an audio or visual cue, where if the stacking or sorting threshold exceeds a same or different threshold, a detected stacking or sorting anomaly at an output device can be reported by any suitable visual or audio cue, including a warning on a computer display, a light indication, an audio alert, and combinations thereof.

The new system and method of the Application can be used at any point that performs media stacking or sorting during media transport typically, at an output device of a high-speed apparatus that processes media. The new system and method of the Application can also be used where moving media does not travel on a fixed path, or where there is some unpredictability of media movement during stacking or sorting, such as, for example, media ejection, media falling or dropping, media flipping, or media throwing.

Thresholds can be determined initially by one or more experts listening to or monitoring audio data and assigning quality ratings to various audio data under different output device actual or simulated conditions. In the case of neural networks, rather than assigning thresholds directly, rather various known conditions can be provided to the neural network as ground truth data, whereby the neural network then determines the threshold values, as guided by training, such as training by the provided ground truth data. Such assigning of threshold values can be done for a given type, model, and operating and media parameters of a high-speed apparatus, or for each individual machine at time of manufacture or during an installation process in the field.

Figure 6:
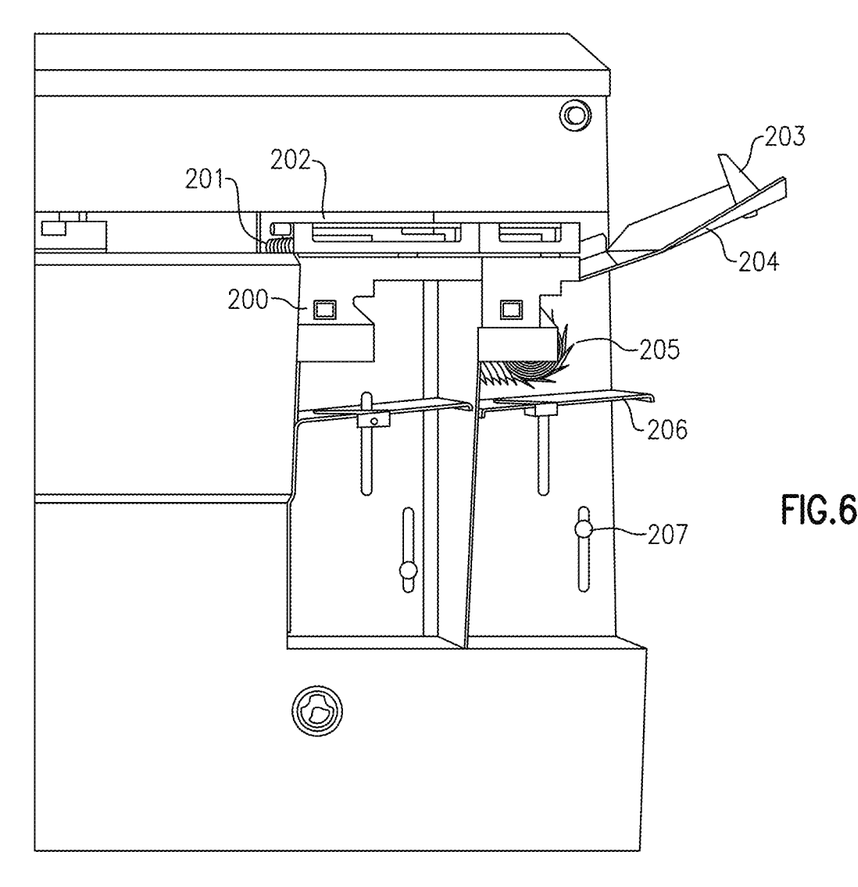
FIG. 6 is a drawing showing an exemplary apparatus suitable for use with the new method of the Application to stop media disfiguration or disorientation.

FIG. 6 is a drawing of an apparatus suitable for use with the new method of the Application to stop media disfiguration or disorientation. The new method was used to determine stacking or sorting integrity on a high-speed scanner using 241$b$ printer paper. The scanner of this exemplary implementation can process up to about 30 documents per second, and subsequently has multiple pieces of media being stacked simultaneously on its output. Scanned paper is sorted between two vertical pocket trays 206 and a run out tray 204 with a paper stop 203. Paper enters the output of the scanner through a roller 201, and once the scanner determines which pocket the paper must be deposited, it enters a tight space in between two of the plurality of spindles 205 extending radially outward from a wheel above the pocket. Paper that enters the right pocket tray 206 or the run-out tray 204 is pushed under a pocket track lid 202 before entering its respective destination. A detection apparatus can be placed behind the pocket 206 or can be physically mounted external to the scanner.

Figure 7A:
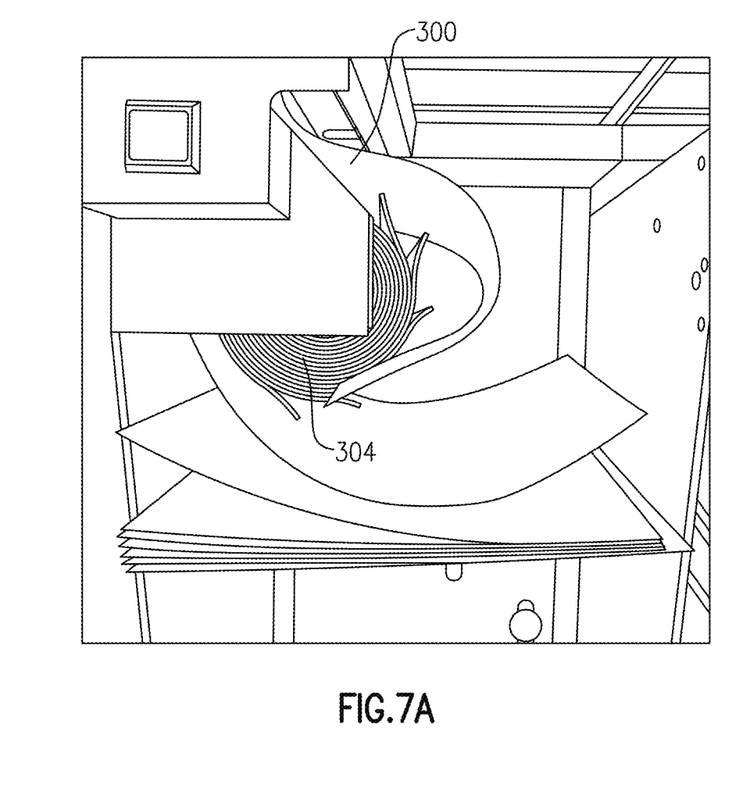
FIG. 7A is a drawing showing a media transport within an apparatus suitable for use with new method of the Application.
Figure 7B:
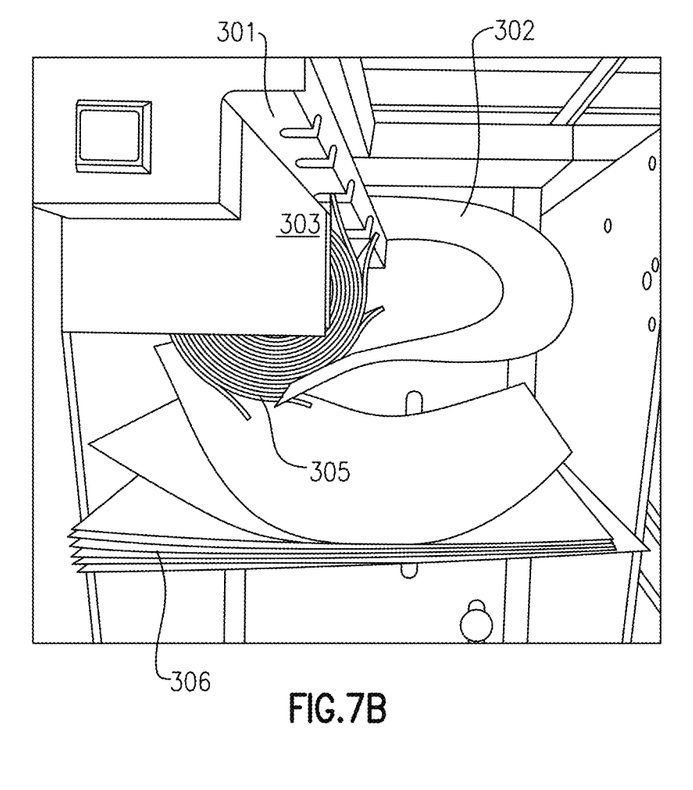
FIG. 7B is a drawing showing the media transport apparatus of FIG. 7A.

In FIGS. 7A and 7B, a piece of paper 300 enters the pocket tray of the scanner and is pushed by rollers 301. As a wheel containing a plurality of spindles extending radially outward turns, the paper slides down a 45-degree path is guided by the curved finger tip 305 into the opening 303 between two spindles, and is held in place by a spindle 304. When the wheel containing a plurality of paper turns a predetermined distance, the paper is released from the tight space in between the spindles and is directed toward paper that is already stacked. During the time in between a piece of paper enters the pocket 300 and is directed out from between a plurality of spindles using a spindle finger 305, the paper is turned 302 to lay in the pocket. Paper is in freefall before being stacked horizontally in the bin or tray with other paper 306.

The complex movement of sorting or stacking paper in the scanner make it difficult to implement traditional methods that track media transport in stacking or sorting.

Based on experience and testing, on average, stacking or sorting integrity have been compromised after scanning around 3000 documents. In the event that stacking or sorting integrity is compromised, the user has options to adjust pocket tension through the pocket tension adjustment handle 207 or to stop paper from entering a pocket with low stacking or sorting integrity through a pocket control button 200, but the pocket tension adjustment handle 207 and pocket control button 200 are out of reach of the operator of the scanner. Some instances when stacking or sorting integrity was compromised include the wheel containing the plurality of spindles extending radially outward from its center being loose; paper being moved at very high speeds, which caused paper to insecurely enter between two of the plurality of spindles on the wheel of the scanner; and paper damage prior to entering between two of the plurality of spindles.

During testing, paper entering the output of the scanner emitted noticeably different sounds in the frequency range of 5.85 kHz-6.15 kHz when pages were not stacked or sorted properly on the output. The frequency band at which new sounds were emitted during low stacking or sorting integrity was found by subtracting the sound of high quality stacking or sorting integrity from the sounds produced during low stacking or sorting integrity in addition to manual comparison of power spectral density graphs in the frequency domain. Analysis of the audio's frequency content revealed that there was about 6 dB more energy within the frequency range centered at about 6 kHz, for example, in a range of about 5.85 kHz-6.15 kHz at the moment incorrect stacking or sorting occurred on the scanner's output than at the times when media was stacked correctly. When there was about 6 dB more energy within the frequency range centered at about 6 kHz, stacking or sorting integrity was set to low. Once the threshold of 6 dB was crossed, the system for evaluating stacking or sorting integrity at the output device according to the Application notifies the user that stacking integrity, or sorting integrity was deteriorating.

Bandwidths of interest do not need to be of equal bandwidth. Other bandwidths of interest other than centered around about 6 kHz, specifically those at lower frequencies, were analyzed using a larger bandwidth. One bandwidth of interest was set as 0 Hz to about 1.2 kHz with a center frequency of 600 Hz. This band contained more frequencies because these frequencies contained high energy content primarily from mechanical operation of the high-speed scanner. Thus, the system for evaluating stacking or sorting integrity at the output device according to the Application performed energy content analysis in a narrow bandwidth around frequencies that contained greater energy content when the problem occurred and at a larger bandwidth for frequencies which contained high energy content from normal apparatus operation or high stacking or sorting integrity.

In the exemplary neural network based solution of FIG. 4, as described hereinabove, a neural network was used to receive frequency domain data, analyze energy content in bands of interest, and to determine a quality rating based on the processed audio information. Any suitable processes, such as, for example, the inclusion of digital signal processing techniques, can be used in place of the neural network. A neural network is but one example of a process technique suitable to perform the new method described hereinabove. Audio processing of bands of interest can also be accomplished, at least in part, by analog filtering techniques.

Processor—At least one processor can perform the processes described hereinabove. It can be a standalone dedicated processor, or some or all of the described processes can also run on one or more processors already present in an apparatus, such as, for example, a high speed sorting apparatus. Any suitable processer can be used ranging from an embedded microcontroller or microcomputer to a processor of a programmable logic controller. The processor can also be provided by any suitable computer operatively coupled to the apparatus.

Software, firmware, modeling, and measurement code for the method for determining stacking and sorting quality in apparatus that process media described hereinabove can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, can be combined into many other different systems or applications. Various presently unforeseen or unanticipated alternatives, modifications, variations, or improvements therein can be subsequently made by those skilled in the art which are also intended to be encompassed by the following claims.

What is claimed is:

1. A method for evaluating stacking or sorting integrity at an output device of a high-speed apparatus that processes media comprising:

acquiring audio data substantially in real-time from the output device of the high-speed apparatus while the high-speed apparatus is in operation, by use of an audio sensor located at the output device;

transforming by a processor, said audio data to into a stacking or sorting integrity value;

wherein an indication of an operational failure is based on said stacking or sorting integrity value, wherein based on said indication of an operational failure, the apparatus directs media to a different stacking or sorting location; and if said stacking or sorting integrity value exceeds a predetermined threshold, slowing or stopping by said processor a document transport of the high-speed apparatus.

2. The method of claim 1, further including the step, wherein if said stacking or sorting integrity value exceeds a same or different predetermined threshold, reporting by said processor a visual display or a sound cue, based on said stacking or sorting integrity value.

3. The method of claim 1, wherein said step of transforming by said processor, comprises transforming by said processor, said audio data in a time domain.

4. The method of claim 1, wherein said step of transforming by said processor, comprises converting said audio data from a time domain into a frequency domain data, and wherein said integrity of output operation value is determined at least in part based on said frequency domain data.

5. The method of claim 4, wherein said step of converting by said processor comprises converting by said processor running a fast Fourier transform (FFT) process, said audio data from said time domain to said frequency domain data.

6. The method of claim 1, wherein said step of transforming by said processor, comprises transforming by said processor said audio data in a time domain, a frequency domain, or combination thereof by a neural network running on said processor.

7. The method of claim 1, wherein said step of acquiring said audio data from the output device of the high-speed apparatus comprises acquiring said audio data by a microphone or a contact microphone.

8. The method of claim 1, wherein said step of acquiring said audio data from the output device of the high-speed apparatus comprises acquiring said audio data by a plurality of audio sensors.

9. The method of claim 1, further comprising, following said step of transforming, the step of redirecting media to another destination if said integrity of output operation value falls below a low threshold value.

10. The method of claim 1, wherein said step of converting by said processor comprises converting by said processor, said audio data from a time domain to a frequency domain to generate energy content data in two or more bandwidths.

11. The method of claim 1, wherein said step of acquiring said audio data from the output device of the high-speed apparatus comprises acquiring said audio data of a media in motion or in freefall before being deposited on the output device.

12. The method of claim 1, wherein said step of transforming further comprises determining if the output device of the high-speed apparatus is full.

13. An apparatus for evaluating stacking or sorting integrity at an output device of a high-speed apparatus that processes media comprising:

at least one apparatus section where media is stacked or sorted;

at least one detection device which listens substantially in real-time to audio generated by the output device in operation and which acquires an audio data;

an audio energy content process runs on a processor that analyzes an audio energy content within one or more bandwidths of said audio data;

an output device quality of operation process which generates a stacking or sorting integrity value based on said audio energy content within said one or more bandwidths of interest, wherein an indication of an operation failure is based on said stacking or sorting integrity value, wherein based on said indication of an operational failure, the apparatus directs media to a different stacking or sorting location; and wherein if said stacking or sorting integrity value exceeds a predetermined threshold, said processor slows or stops a document transport of the high-speed apparatus.

14. The apparatus of claim 13, wherein a visual device or an aural device provides an indication of an operational failure at said output device based on a same or different predetermined threshold in comparison to said stacking or sorting integrity value.

15. The apparatus of claim 13, comprising a neural network.

16. The apparatus of claim 13, wherein said at least one detection device comprises a microphone or a contact microphone.

17. The apparatus of claim 13, wherein an output full device indication is based on said stacking or sorting integrity value.

18. The apparatus of claim 17, wherein based on said output full device indication, the apparatus directs media to a different stacking or sorting location.

19. A system for evaluating stacking or sorting integrity at an output device of a high-speed apparatus that processes media substantially in real-time comprising:

an audio sensor disposed in or near the output device to acquire audio data from the output device of the high-speed apparatus while the high-speed apparatus is in operation substantially in a real-time;

a processor to run a process to transform said audio data into a stacking or sorting integrity value;

wherein if said stacking or sorting integrity value exceeds a predetermined threshold, said processor slows or stops a document transport of the high-speed apparatus;

wherein an indication of an operation failure is based on said stacking or sorting integrity value, and wherein based on said indication of an operational failure, the apparatus directs media to a different stacking or sorting location.

20. The system of claim 19, wherein a visual display or a sound cue operatively coupled to said processor to provide an indication of a fault condition based on exceeding a same or different predetermined threshold of said stacking or sorting integrity value.

* * * * *